No. 869,495.   
PATENTED OCT. 29, 1907.
C. N. LANGDON & O. E. CARLSON.
CHUTE.
APPLICATION FILED NOV. 21, 1906.
3 SHEETS—SHEET 2.
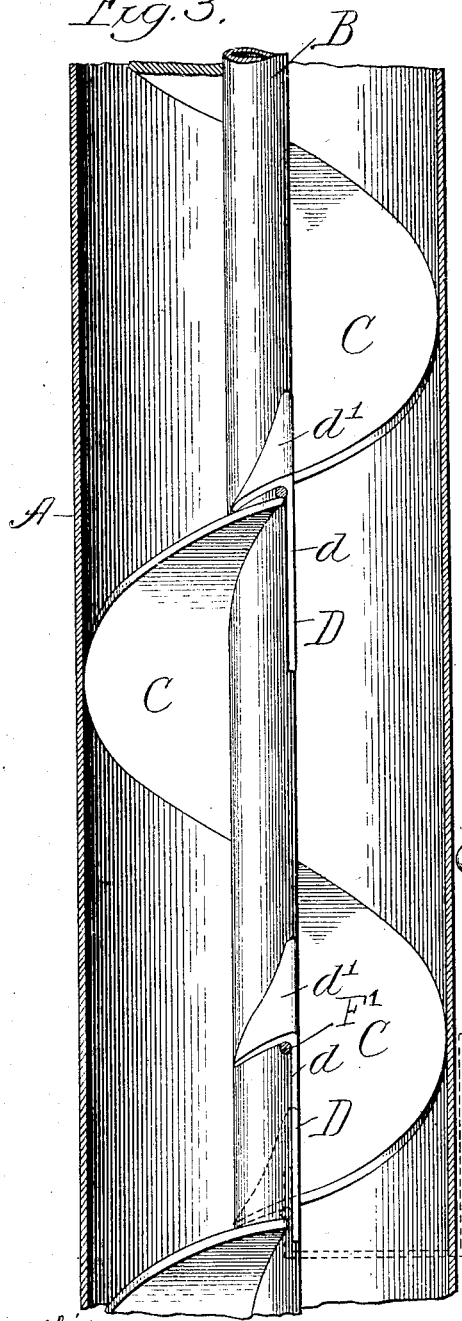
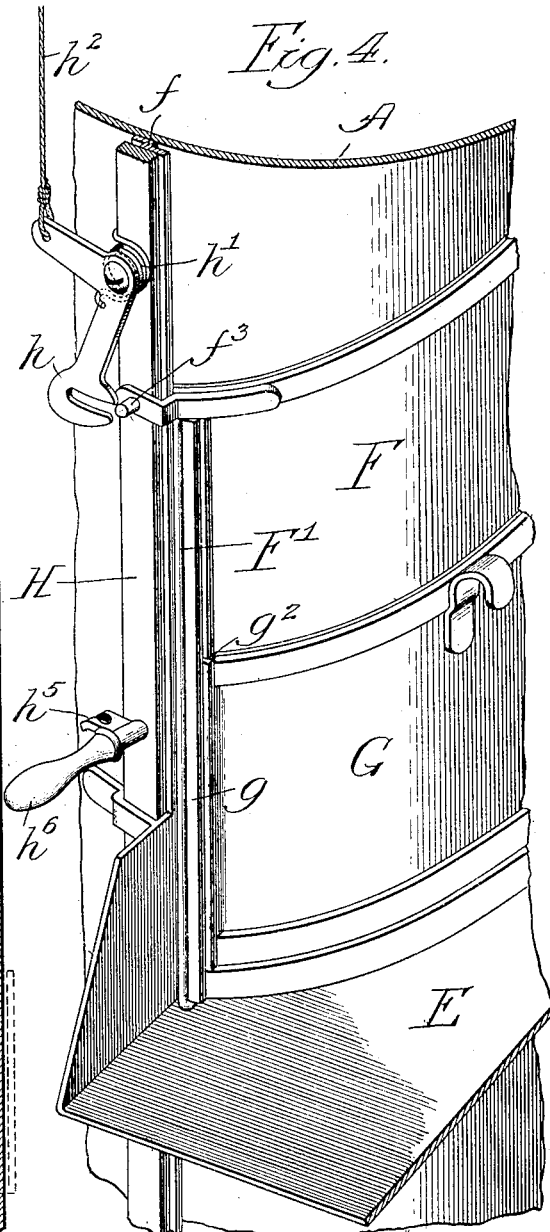
Witnesses:
Inventors:
Charles N. Langdon,
Oscar E. Carlson,
By Dyrenforth, Dyrenforth, Lee and Wiles
Attys.

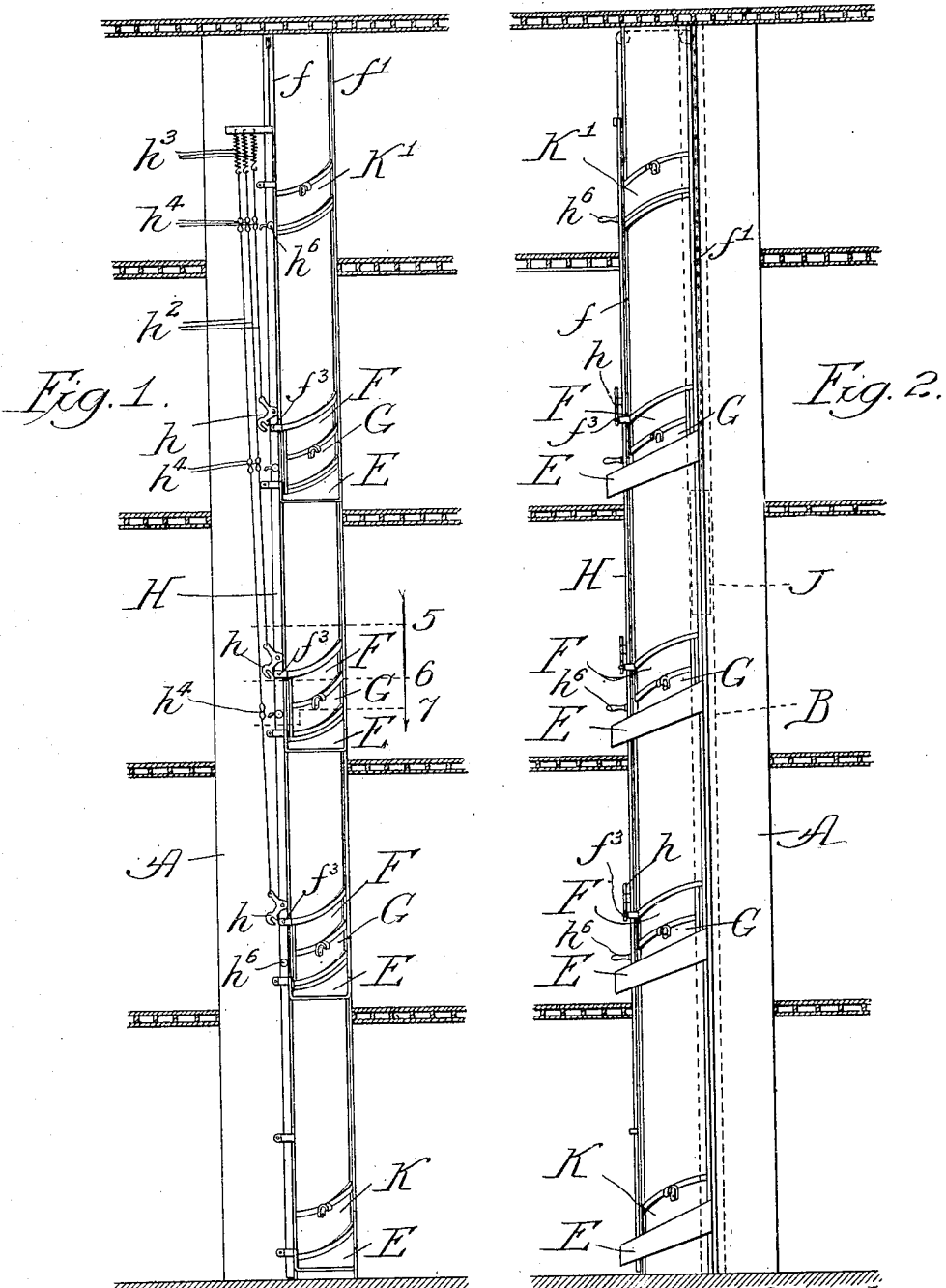

No. 869,495. PATENTED OCT. 29, 1907.
C. N. LANGDON & O. E. CARLSON.
CHUTE.
APPLICATION FILED NOV. 21, 1906.
3 SHEETS—SHEET 3.
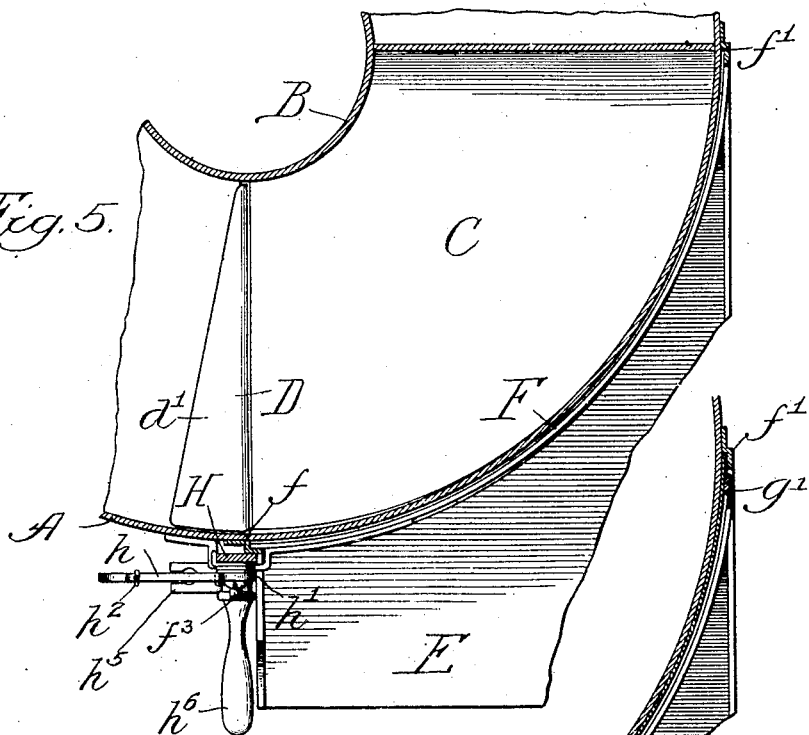
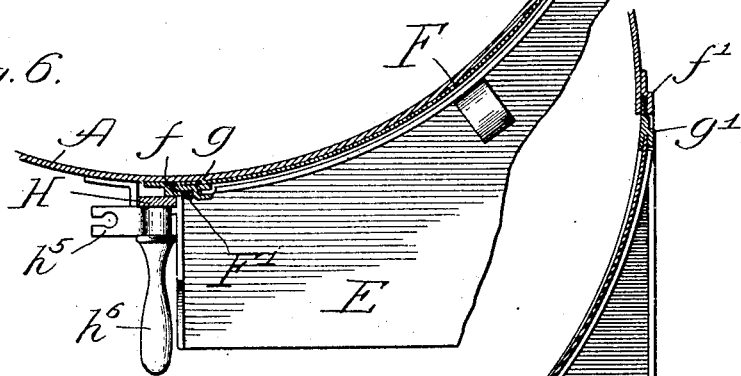
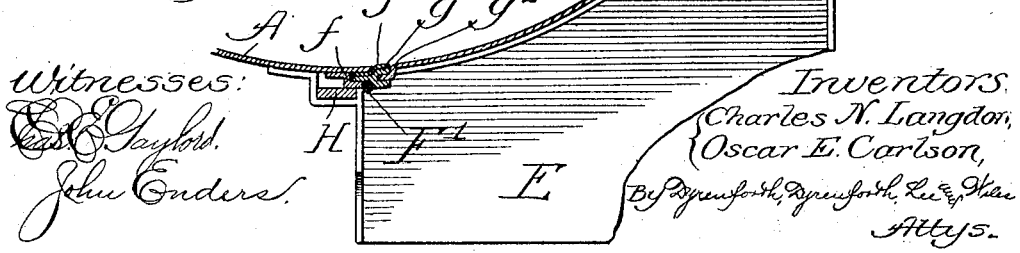
Inventors
Charles N. Langdon,
Oscar E. Carlson,

UNITED STATES PATENT OFFICE.

CHARLES N. LANGDON AND OSCAR E. CARLSON, OF CHICAGO, ILLINOIS, ASSIGNORS TO HUGO ASH, OF CHICAGO, ILLINOIS.

CHUTE.

No. 869,495.  Specification of Letters Patent.  Patented Oct. 29, 1907.

Application filed November 21, 1906. Serial No. 344,379.

*To all whom it may concern:*

Be it known that we, CHARLES N. LANGDON and OSCAR E. CARLSON, citizens of the United States, residing at Chicago, in the county of Cook and State of Illinois, have invented a new and useful Improvement in Chutes, of which the following is a specification.

Our invention relates to certain new and useful improvements in chutes and is described and explained in this specification and shown in the accompanying drawings, in which—

Figure 1 is a front elevation of our improved chute; Fig. 2, a side elevation of the same; Fig. 3, a detail view of a portion of the chute looking at it from the front, the outer tubular wall being cut away in central vertical section to show the interior construction; Fig. 4, a detail perspective view showing the arrangement of the doors at one story and the adjacent parts; Fig. 5, a transverse section in the line 5—5 of Fig. 1; Fig. 6, a similar section in the line 6—6 of Fig. 1; and Fig. 7, a similar section in the line 7—7 of Fig. 1.

Referring to the drawings, A is a vertically disposed tube, preferably of sheet-metal, which forms the outer containing wall of our improved chute. Centrally disposed within the tube A is a tube B, of smaller diameter, which operates as a stiffening member for the structure contained within the tube and performs certain other functions which will hereafter be set forth. Between the tubes A and B are disposed a plurality of spiral slide sections C, each of which extends vertically the height of one story in the building in which the chute is located, each of the slide sections C preferably beginning at a point just above the level of one floor and terminating just above the level of another floor. These sections may be given any desired pitch so that articles passing down the chute will move at the desired speed. It will be seen that the various slide sections are so disposed that each forms a continuation of the one above it, the upper end of each section being slightly in advance of and below the lower end of the next section above. A plurality of vertically shiftable stops D are provided, which slide in the spaces thus provided between the adjacent ends of the slide sections C. Each of the stops D consists of a vertical plate $d$ and an overhanging portion $d^1$, turned in a general downward direction so as to overlap and fit the upper end of the adjacent lower slide sections when the stops are in their lower position which is shown in the upper portion of Fig. 3. When in this position, these overhanging portions of the stop form continuations of and lie in the prolongations of the planes of the adjacent upper slide section, so that an article passing down the chute will slide from an upper slide section on to the overhanging portion of the stop and thence on to the next lower slide section without striking any shoulder or abutment tending to arrest their motion.

The tube A is provided with a plurality of openings at the various floors, the lower corner of each of said openings being substantially coincident with the lower and outer corner of the slide section extending downwards to said story, and the bottom edge of said opening following the curvature of said slide section upwards. The sides of the opening are vertical and parallel and the top of each opening is parallel to the bottom thereof, the dimensions of the openings being sufficient to permit packages to pass out through the same.

A discharge slide E is provided at each of the openings except that at the upper story, so that when the door which closes any given opening (which door will presently be described) is opened and the stop D is raised, any article passing down the slide sections will strike the stop in the position shown at the bottom of Fig. 3 of the drawings, and will thereby be deflected onto the adjacent discharge slide from which it can pass into any suitable receptacle, which may be provided for the purpose. It is evident that the vertical height of the stops D is to a certain extent dependent upon the pitch of the slide, for the stop must at all times be short enough that when in its lowered position it will not interfere with the passage of articles beneath it on the next turn of the spiral. Ordinarily this is a matter which can very easily be arranged, for the pitch of the spiral is much greater than the vertical height of any stop and ample room is provided between the slide and the lower end of any stop above it.

Adjacent to the sides of the openings heretofore described in the wall of the chute are placed vertical guides $f, f^1$. In the preferred form of our construction, the openings are placed vertically one above the other, and in this case the guides for the various openings can be made in continuous pieces extending substantially from top to bottom of the chute, but the angular positions of the openings might be varied, in which case separate guides would be placed for the separate openings. These guides embrace between them vertically movable discharge-doors F, one for each opening, except at the top and bottom of the building. These discharge-doors follow the curvature of the tube A and at their upper lateral edges lie outside the tube (Fig. 7), so that the edge of the tube at the opening which the discharge-door closes forms a downwardly facing shoulder past which the articles moving on the chute can slide without obstruction. At the lower lateral edges these discharge-doors are bent inward at $f^2$ (Fig. 7), so as to lie flush with, or preferably inside of, the inner surface of the tube A, so that any shoulders which may be presented at the lower lateral edges of the openings are likewise downwardly facing, so that they cannot obstruct the passage of articles along the chute.

Each of the discharge-doors F has secured to it along its lower lateral edge a vertical rod $F^1$, the lower end of which is turned inward radially of the tube A and lies in the angle of the corresponding stop D, so that when the discharge-door is opened by means presently to be described, the stop will be raised with it, thus simultaneously uncovering the opening in the tube for the egress of articles and raising the stop to arrest said articles and deflect them onto the corresponding discharge-slide E.

Each of the discharge-doors F is provided with an opening, preferably near its lower edge, said opening being closed by an inlet door G carried by and guided between two vertical guides $g$, $g^1$ mounted upon each discharge-door F. Each of the inlet-doors G is arranged in the same way as the discharge-door F, that is, with its upper lateral edge outside of the discharge-door to form a downwardly facing shoulder and with its lower lateral edge bent in at $g^2$ so as to lie flush with or inside of the corresponding surface of the discharge-door, whereby any shoulder formed faces downwardly. By this means the two doors are provided, either of which can be opened at will, and yet when both doors are closed there is no shoulder to interfere with the passage of articles along the slide-way, or to damage them in any way. The inlet-doors G can be raised without in any way affecting the discharge-doors F, and when so opened articles can be thrown into the chute and will pass downward in the same in the usual way.

Each of the discharge-doors F is provided at its upper corner with a pin $f^3$, which is adapted to be engaged by a hook $h$ carried by a lifting-bar H which extends from top to bottom of the chute. The hooks $h$ are engaged by springs $h^1$ which tend to hold them normally in engagement with said pins, and said hooks are held out of such engagement by means of cords $h^2$ extending upwards from said hooks to the upper portion of the lifting-bar H, where they are attached to springs $h^3$ carried by said bar H, which springs overcome the actions of the various springs $h^1$ and hold the hooks against the action of such springs in the position shown in Fig. 4. The cords $h^2$ are provided with buttons $h^4$ at the various floors above the doors to which they run, so that any cord can be drawn down at any floor above the door to which it runs, so as to relieve the hook to which it is connected from the tension of the springs $h^3$, the button being passed under a notched clip $h^5$ (Fig. 6) carried by and movable with the lifting-bar H. The effect of such action will obviously be to throw the hook whose cord has been drawn down into engagement with the corresponding pin $f^3$ on the proper discharge-door F. Thereupon the lifting-bar H can be bodily raised by means of handles $h^6$ attached thereto, thus drawing up the discharge-door desired. Material can then be introduced into the chute at any floor above the one whose discharge slide is raised, and such material will issue from the chute at the proper floor.

Owing to the weight of the lifting-bar H, we prefer to provide a suitable counter-balance for said bar, which counter-balance can conveniently be placed within the tube B, which forms the center of the chute. This counterbalancing weight, indicated in dotted lines in Fig. 2 and designated by the letter J, is connected by a rope which runs over suitable pulleys with the upper end of the lifting-bar H.

In most large mercantile houses the stock-room is on the top floor and the shipping-room is in the basement. It is often desirable to ship goods from one intermediate floor to another intermediate floor, but the great bulk of the shipment occurs between the stock-room and one of the intermediate floors, and between one of the intermediate floors and the basement or shipping-room. Obviously, no goods are ever shipped through the chute from the basement, nor are any goods ever received through the chute at the stock-room on the top floor, and, as a result, no doors need be provided at the openings on these floors. However, we provide doors K, $K^1$ at the basement and top floor, respectively, to serve as fire protection. These doors may be of any ordinary construction and are kept open throughout business hours. By manipulating the lifting-bar and cords as above set forth goods can be shipped from the stock-room or from any other floor to any lower floor, and if no manipulation is done all goods will be shipped to the basement. By observing the position of the lifting-bar H, the employees can readily tell whether the chute is set to discharge at any floor or to transmit goods through to the basement, and thus there is no danger of goods being improperly transmitted.

What we claim as new, and desire to secure by Letters Patent, is—

1. The combination with a wall having an opening, of two spiral sections therein, one forming a substantial continuation of the other, the junction of said sections being located adjacent to said opening, and a shiftable stop interposed between said sections and having a portion which overhangs the lower section and does not extend above the level of the surface of said upper section.

2. The combination with a cylindrical wall having an opening therein and a spiral slide-way within said wall, of a door in said wall, the upper lateral edge of which lies outside the inner surface of said wall and the lower lateral edge of which does not lie outside of said wall, whereby the shoulders formed on said lateral edges are downwardly facing.

3. The combination with a wall having an opening therein and a spiral slide-way within said wall, of a discharge-door movable in said wall to uncover said opening, a shiftable stop movable with said discharge-door to arrest the progress of articles on said slide-way and deflect them through said opening, and an intake-door carried by said discharge-door and closing an opening therein.

4. The combination with an outer wall and a spiral slide-way therein, of a discharge-door in said outer wall, a reciprocable lifting-bar and means operable from a floor above said discharge-door for connecting said door with said lifting-bar.

5. The combination with an outer wall and a spiral slide-way therein, of a plurality of discharge-doors in said outer wall, vertically shiftable stops adjacent to said doors and connected therewith and adapted to be moved with said doors to interrupt said slide-way, a vertically shiftable lifting-bar, and means on said lifting-bar for connecting said discharge-doors at will with said lifting-bar, said means being operable in each case from a floor above the door on which it operates.

6. The combination with an outer wall and a slide-way therein, of a movable discharge-door, a vertically shiftable lifting-bar, a hook on said lifting-bar, means for holding said hook normally in engagement with said discharge-door, and means controllable from a floor above said door for holding said hook out of such engagement.

7. The combination with an outer wall and a slide-way therein, of a discharge-door, a vertically shiftable lifting-bar controllable from a floor above said discharge-door, an engagement device on said lifting-bar, means for holding said engagement device normally in engagement with said discharge-door, and a stronger device overcoming said holding means and controllable from a floor above said discharge-door for holding said engagement device out of engagement with said discharge-door.

8. The combination with an outer wall, a slide-way therein, and a discharge-door in said outer wall, of a vertically movable lifting-bar, a hook on said lifting-bar adapted to engage said discharge-door, a spring normally holding said hook in engagement with said door, a cord extending upward from said hook, a spring attached to said cord at its upper end and adapted to overcome said first-named spring and hold said hook out of engagement with said discharge-door, buttons on said cord, and means on said lifting-bar with which said buttons may engage to hold said second spring out of action.

9. The combination with an outer wall and a slide-way therein, of a discharge-door, a stop having means of engagement with said door whereby when the door is raised the stop will intersect the slide-way to deflect articles through the opening covered by said door, means controllable from a floor above for opening said discharge door, and an inlet-door mounted upon and carried by said discharge-door and controlling an opening therein.

10. The combination with an outer wall, a spiral slide-way therein and having two sections, one the continuation of the other whose junction is adjacent to an opening in said outer wall, a vertically shiftable stop interposed between said sections and having an overhanging portion above the upper end of the lower of said two sections, a discharge-door controlling the opening aforesaid in said outer wall, a rod secured to said discharge-door and having a portion extended under said overhanging portion of said stop whereby the lifting of said door will raise said stop to interrupt the continuity of said spiral slide-way.

11. The combination with an outer wall and a spiral slide-way therein, of a discharge-door controlling an opening in said outer wall, said discharge-door having its upper lateral edge outside the inner surface of said wall and having its lower lateral edge as far out as the inner surface thereof, an inlet-door mounted upon and carried by said discharge-door and controlling an opening in said discharge-door, said inlet-door having its upper lateral edge outside the inner surface of said discharge-door and having its lower lateral edge not outside the inner surface thereof, whereby any shoulders formed at the junctions of said doors with each other and with said outer wall will form downwardly facing shoulders.

12. The combination with an outer wall, a central hollow tube and a spiral slide-way between said tubes, of a series of discharge-doors, a vertically shiftable lifting-bar for controlling said discharge-doors, and a counterweight for said lifting-bar within said inner tube.

CHARLES N. LANGDON.
OSCAR E. CARLSON.

In presence of—
J. H. LANDES,
C. W. WASHBURNE.